(12) United States Patent
Koh et al.

(10) Patent No.: US 12,360,582 B2
(45) Date of Patent: Jul. 15, 2025

(54) ELECTRONIC DEVICE AND METHOD OF RESPONDING TO A TRIGGER TO WAKE UP

(71) Applicant: Continental Automotive Technologies GmbH, Hannover (DE)

(72) Inventors: Jun Han Koh, Singapore (SG); Hoe Chun Goh, Singapore (SG)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 17/919,781

(22) PCT Filed: Apr. 20, 2021

(86) PCT No.: PCT/EP2021/060152
§ 371 (c)(1),
(2) Date: Oct. 19, 2022

(87) PCT Pub. No.: WO2021/214010
PCT Pub. Date: Oct. 28, 2021

(65) Prior Publication Data
US 2024/0295913 A1    Sep. 5, 2024

(30) Foreign Application Priority Data

Apr. 20, 2020 (GB) ..................................... 2005673

(51) Int. Cl.
*G06F 1/00* (2006.01)
*G06F 1/3215* (2019.01)
*G06F 1/3234* (2019.01)

(52) U.S. Cl.
CPC .......... *G06F 1/3215* (2013.01); *G06F 1/3243* (2013.01)

(58) Field of Classification Search
CPC ............................. G06F 1/3215; G06F 1/3243
See application file for complete search history.

(56) References Cited

U.S. PATENT DOCUMENTS

| 4,159,516 A | 6/1979 | Henrion et al. |
| 5,555,287 A | 9/1996 | Gulick et al. |

(Continued)

FOREIGN PATENT DOCUMENTS

| CN | 106218550 B | 2/2019 |
| EP | 0580341 A2 | 1/1994 |

(Continued)

OTHER PUBLICATIONS

Office Action dated Jun. 28, 2024 of the counterpart GB application No. 2005673.5.

(Continued)

*Primary Examiner* — Mohammed H Rehman

(57) ABSTRACT

There is provided an electronic device comprising: an input-output management device configured to manage input-output connections; and a microcontroller communicatively connected to the input-output management device, wherein the microcontroller is configured to perform an initialization phase after a trigger is received from an input-output connection to wake the electronic device from a powered down state, the initialization phase comprising: obtaining, from the input-output management device, wake-up statuses of the input-output connections managed by the input-output management device; and storing the statuses in a memory of the microcontroller; wherein the microcontroller is further configured to perform an operation phase after the initialization phase, the operation phase comprising: transmitting a wake-up confirmation message to the input-output connection with a positive wake-up status. There is also provided a method of responding to a trigger to wake an electronic device from a powered down state.

20 Claims, 1 Drawing Sheet

(56) References Cited

U.S. PATENT DOCUMENTS

| | | | |
|---|---|---|---|
| 6,125,139 | A | 9/2000 | Hendrickson et al. |
| 6,519,720 | B1 | 2/2003 | Mores |
| 9,900,390 | B2* | 2/2018 | Holloway ............. G06F 1/3287 |
| 2004/0176857 | A1 | 9/2004 | Tsunedomi |
| 2005/0027898 | A1 | 3/2005 | Kuder et al. |
| 2006/0255908 | A1* | 11/2006 | Gilbert .................... B60R 25/24 |
| | | | 340/426.36 |
| 2007/0230484 | A1 | 10/2007 | Hu et al. |
| 2012/0257655 | A1* | 10/2012 | Muth ...................... H04L 12/12 |
| | | | 375/219 |
| 2013/0173949 | A1* | 7/2013 | Cai ........................... G06F 1/04 |
| | | | 713/503 |
| 2013/0234508 | A1* | 9/2013 | Eisele .................... B60L 50/51 |
| | | | 307/9.1 |
| 2014/0350772 | A1 | 11/2014 | Saito |
| 2016/0294578 | A1* | 10/2016 | Maise ............... H04L 12/40013 |
| 2018/0105183 | A1 | 4/2018 | Kollmer |
| 2018/0234921 | A1* | 8/2018 | Huang ............... H04W 52/0235 |
| 2020/0125355 | A1 | 4/2020 | Aust |
| 2021/0081021 | A1 | 3/2021 | Yu |

FOREIGN PATENT DOCUMENTS

| | | | |
|---|---|---|---|
| EP | 0657806 | A1 | 6/1995 |
| EP | 2189948 | A2 | 5/2010 |
| JP | H06169280 | A | 6/1994 |
| JP | 2002300165 | A | 10/2002 |
| JP | 2004272386 | A | 9/2004 |
| JP | 2014227060 | A | 12/2014 |
| JP | 2015180527 | A | 10/2015 |
| JP | 2018528111 | A | 9/2018 |
| WO | 2019009020 | A1 | 1/2019 |
| WO | 2019227998 | A1 | 12/2019 |

OTHER PUBLICATIONS

Notice of Reasons for Refusal drafted Oct. 26, 2023 for the counterpart Japanese Patent Application No. 2022-562779 and translation of same.

Intellectual Property Office Examination Report for the counterpart Great Britain Patent Application No. 2005673.5.

Search Report dated Sep. 30, 2020 from corresponding GB patent application No. 2005673.5.

International Search Report and Written Opinion dated Jul. 13, 2021 from corresponding International patent application No. PCT/EP2021/060152.

* cited by examiner

ELECTRONIC DEVICE AND METHOD OF RESPONDING TO A TRIGGER TO WAKE UP

FIELD

This invention generally relates to electronic devices and specifically relates to optimizing the time taken for an electronic device to wake-up.

BACKGROUND

Electronic devices often function with various operating states, such as a powered down state and a normal operational state. The powered down state or a sleep mode is used to conserve the device's power source when the device is inactive, e.g. when no actions are required. The device is powered up or awakened when actions are required of the device, e.g. when a message is transmitted to the device for acting upon. For consumer devices, it is essential that the time taken to power up and act on the action is as short as possible.

There are many existing solutions aiming to reduce the time taken to power up. However, as electronic devices become more complex, the number of components or modules within a device is ever increasing. Consequently, an increased amount of time is required to power up the various components and modules in a device.

There is therefore a need to provide an electronic device and method that overcome or at least ameliorate one or more of the disadvantages discussed above.

BRIEF SUMMARY

It is an object to provide an electronic device and method that address one or more of the problems discussed above.

To accomplish this and other objects, there is provided, in an aspect, an electronic device comprising: an input-output management device configured to manage input-output connections; and a microcontroller communicatively connected to the input-output management device, wherein the microcontroller is configured to perform an initialization phase after a trigger is received from an input-output connection to wake the electronic device from a powered down state, the initialization phase comprising: obtaining, from the input-output management device, wake-up statuses of the input-output connections managed by the input-output management device; and storing the statuses in a memory of the microcontroller; wherein the microcontroller is further configured to perform an operation phase after the initialization phase, the operation phase comprising: transmitting a wake-up confirmation message to the input-output connection with a positive wake-up status.

In another aspect, there is provided a method of responding to a trigger to wake an electronic device from a powered down state, the method comprising: receiving a trigger from an input-output connection of the electronic device to wake the electronic device from the powered down state; performing, by a microcontroller of the electronic device, an initialization phase, wherein the initialization phase comprises: obtaining, from an input-output management device communicatively connected to the microcontroller, wake-up statuses of input-output connections managed by the input-output management device; and storing the statuses in a memory of the microcontroller. The method further comprises: performing, by the microcontroller, an operation phase after the initialization phase, wherein the operation phase comprises: transmitting a wake-up confirmation message to the input-output connection with a positive wake-up status.

When a trigger is received by a sleeping electronic device from an input-output connection, a response to the trigger may include transmitting a wake-up confirmation message to the input-output connection confirming that the electronic device is ready, e.g. in a normal operational state or operation phase. In order to act on the trigger, the electronic device and its components and modules need to be woken up. The present disclosure advantageously provides a solution to optimize the time taken for an electronic device to transit between receiving a trigger to wake up and responding to the trigger.

The microcontroller may be configured to implement an operating system in accordance with industry standards relevant to the electronic device, such as the AUTOSAR or OSEK standards for electronic devices in automotive systems. The operating system may serve as a basis for application programs and/or other software modules which are independent of each other, and provides their environment on a processor. The disclosed initialization phase and operation phase performed by the microcontroller may be implemented in accordance with such industry standards. The disclosed initialization phase and operation phase may be part of the operating system of the microcontroller.

In order not to overload the microcontroller with applications that are peripheral to the function of the microcontroller, separate components or devices may be introduced into the electronic device to carry out such features. An example of such feature is the implementation of an application program for a function of the electronic device, for which another component dedicated for the application, such as another controller, integrated circuit or system-on-chip, may be introduced into the electronic device. Another example of such feature is the management of the input-output devices that are connected to the electronic device. In the disclosed electronic device, the input-output management device is a component dedicated to managing the input-output devices.

The initialization phase performed by the microcontroller may include a plurality of tasks to initialize the plurality of hardware components and/or software modules of the electronic device. The operation phase may include executing scheduled tasks, periodic tasks and/or user tasks. The present disclosure advantageously exploits the components and/or modules that have completed initialization to obtain information required for responding to the trigger. The present disclosure advantageously utilizes the initialization phase or actions available during the initialization phase to obtain information required for responding to the trigger. The present disclosure advantageously enables a response to the trigger to be provided once the electronic device is in the operation phase.

When a trigger to wake up is received by a sleeping electronic device, the electronic device may not yet be aware of what had triggered the wake up. In order to respond to the wake-up trigger, the electronic device or microcontroller may determine where the trigger came from or which device triggered the power up. The initialization phase may comprise obtaining information to determine where the trigger originated.

Possible triggers to wake an electronic device from a powered down state may depend on the functions of the electronic device or applications on the electronic device.

The disclosed electronic device may be accessed by one, two or a plurality of input-output devices. Input-output devices are devices that enable communication with the electronic device. Input-output devices may enable the electronic device to communicate or connect with other devices or systems in a network or with users. The electronic device may be accessed by such peripheral devices. Input-output devices may enable the receipt of user input or may output information to users. An input-output device may provide the electronic device with instructions or actions to execute or may cause the electronic device to execute instructions or actions. Hence, an input-output device may provide or transmit a trigger to cause the electronic device to wake up from its powered down state.

Input-output devices of an electronic device may differ from electronic device to electronic device. For example, a typical input-output device to a vehicle electronic control unit may be a network communication device such as a CAN bus or other network buses like ethernet buses or wireless communication modules. Other input-output devices may include, for example for a vehicle telematics control unit, a microphone, emergency call button, and airbag control unit.

The input-output device may be connected to the electronic device by input-output connections. An input-output device may comprise a plurality of input-output connections. The input-output connections may be connected to a component or several components of the electronic device. In embodiments, one or more input-output connections of an input-output device may be connected to the input-output management device. Additionally, or alternatively, one or more input-output connections of an input-output device may be connected to the microcontroller.

The electronic device or microcontroller may obtain a status of a component or part of the electronic device that may be a possible trigger, in order to respond to the trigger. The status of all components or parts of the electronic device that may be possible triggers may be obtained. The status of the component or part indicating whether it is awake, i.e. a wake-up status, may be obtained. The wake-up status may be in the form of an indication indicating that the component or part has woken up (i.e. a positive wake-up status) or not (i.e. a negative wake-up status). The wake-up status may be in the form of a wake-up signal or an electrical signal to or from a component or part. The electrical signal may be a pulse to or from an electrical pin. The electrical signal may be a pulse to an electrical pin specifically for wake-up. Such pins may be connected to any component of the electronic device, for example the microcontroller, the input-output management device, or other processor. The electrical signal may be a pulse from an electrical pin of an input-output device, such as an inhibit pin or enable pin, that may in turn trigger a pulse to a wake-up pin. Identifying a positive wake-up status or an activated wake-up signal may indicate the source of the wake-up trigger. The wake-up trigger may be received by wake-up pins.

In embodiments, the possible wake-up triggers for the disclosed electronic device may originate from its input-output devices. A wake-up status of an input-output device may be managed by the input-output management device or may be stored in the input-output management device. The input-output management device may be connected, via an electrical pin, to an input-output connection of an input-output device. The electrical pin may be specifically for wake-up. The input-output management device may be connected to the wake-up pins for all input-output devices of the electronic device. The wake-up statuses may be obtained from wake-up pins of the input-output connections, the wake-up pins being connected to the input-output management device. A pulse from an input-output device responsible for waking up the electronic device to the wake-up pin may indicate the source of the wake-up trigger. A pulse from an electrical pin of an input-output device, such as an inhibit pin or enable pin, which in turn triggers a pulse to a wake-up pin connected to the input-output management device, may indicate the source of the wake-up trigger. A wake-up pin with a pulse may indicate a positive wake-up status. Identifying a wake-up pin with a pulse may indicate the source of the wake-up trigger. Thus, the wake-up status of an input-output connection may be obtained. The wake-up status, e.g. a presence or absence of a pulse to the wake-up pin, may be stored in a memory or register of the input-output management device. The presence or absence of a pulse from an input-output device responsible for waking up the electronic device to the wake-up pin may be recorded in the memory or register of the input-output management device. The microcontroller may obtain such wake-up statuses from the memory or register of the input-output management device.

Upon receipt of a wake-up trigger, the input-output management device may wake up from a powered down state. Upon receipt of the trigger, the input-output management device may initialize itself. In such embodiments, the initialization phase performed by the microcontroller may not include initializing the input-output management device. Awakening of the input-output management device may cause a wake-up signal to be transmitted from the input-output management device to the microcontroller.

Regardless of whether a signal is transmitted from a wake-up source through an intermediary like the disclosed input-output management device, an electronic device typically relies on an interrupt pin to be woken up. The interrupt pin may be connected to the component that initializes all or at least most components of the electronic device. In embodiments, an electrical signal or a wake-up signal may be transmitted to an electrical pin such as an interrupt pin connected to the microcontroller. Hence, wake-up may be detected by a change in signal from a wake-up source such as an input-output device, which may ultimately feed into an interrupt pin on the microcontroller. The wake-up signal may be transmitted from the input-output management device to the microcontroller via a connection woken up during initialization of the input-output management device. This connection is separate from the communicative connection that may transmit the wake-up status to the microcontroller. The microcontroller may initiate the initialization phase based on such signal received by the microcontroller.

The microcontroller is connected to the input-output management device by a communicative connection. The wake-up status of each input-output device or input-output connection may be transmitted to the microcontroller via the communicative connection. The microcontroller may obtain the wake-up status via the communicative connection. The microcontroller may be configured to request the input-output management device to transmit the wake-up status via the communicative connection. Information required for responding to the trigger, other than the wake-up status, may be transmitted to the microcontroller via the communicative connection or other connections to the microcontroller. Prior to the step of obtaining the wake-up statuses, the initialization phase may further comprise completing initialization of the communicative connection between the microcontroller and the input-output management device.

The communicative connection transmitting the wake-up status from the input-output management device to the microcontroller may be initialized during the initialization phase performed by the microcontroller. The initialization of the communicative connection may be completed during the initialization phase of the microcontroller.

There may be various means of obtaining the wake-up status from the input-output management device via the communicative connection. Selecting the means for which initialization can be completed the quickest may optimize the time taken to respond to the trigger. In an example, the microcontroller may comprise a software module that communicates with the input-output management device, thus may be configured to obtain the wake-up statuses from the input-output management device. However, the tasks required for completing initialization of such module may not be prioritized during the initialization phase of the microcontroller. As such, the software module may be configured to complete its initialization or become stabilized only during the operation phase of the microcontroller. In another example, the input-output management device may be configured to transmit the wake-up statuses to the microcontroller. However, it may take some time for its initialization to be completed. The input-output management device, being a dedicated device, may not even be configurable to push wake-up statuses to the microcontroller.

Hence, the communicative connection between the input-output management device and the microcontroller may advantageously be the first means available to obtain the requisite information to respond to a wake-up trigger. Advantageously, the communicative connection may be utilized to determine where the wake-up trigger originated. Furthermore, in embodiments where the possible wake-up sources are input-output network communication devices, a module of the microcontroller responsible for network management may advantageously be utilized for transmitting a response to the network communication device with a positive wake-up status. Such network management module of the microcontroller may be initialized during the initialization phase performed by the microcontroller. The initialization phase may comprise a network management initialization task. The network management initialization task may comprise tasks to initialize the network management module. The network management initialization task may comprise initializing network interfaces of the electronic device, such as the communicative connection transmitting the wake-up status from the input-output management device to the microcontroller. As part of initializing the network interfaces, the initialization phase may be configured to command the network interfaces to communicate with the input-output management device. The initialization phase may be configured to include requesting the input-output management device to transmit the wake-up status via the communicative connection. The initialization phase may further comprise instructing the input-output management device to transmit the wake-up status of the input-output connections managed by the input-output management device. In embodiments where the network management module is responsible for transmitting the wake-up confirmation message, using the initialization tasks of the network management module to obtain the wake-up statuses may optimize the process. At the same time, since the network management module has to be initialized before the wake-up confirmation message is transmitted, the network management initialization is advantageously used to obtain the wake-up statuses. Advantageously, time taken to respond to a trigger is optimized because the present disclosure utilizes tasks of an initialization phase of an operating system. Responding to a trigger may not be dependent on additional modules or components being operationally ready.

The communicative connection transmitting the wake-up status from the input-output management device to the microcontroller may be any suitable connection, such as an SPI bus.

The microcontroller may still be in the initialization phase when the wake-up status is received. The wake-up status may be saved in a memory of the microcontroller for use during the operation phase. In embodiments where the network management module is responsible for transmitting the wake-up confirmation message, the wake-up status may be saved in a RAM of the microcontroller which is accessible to the network management module. The operation phase may include a plurality of tasks to implement the operation of the electronic device. The operation phase may be configured to include identifying or determining a positive wake-up status from the wake-up statuses obtained from the input-output management device. The operation phase may further comprise identifying or determining a positive wake-up status from the wake-up statuses obtained from the input-output management device. A response may then be appropriately provided to the component or device that triggered the wake-up which would have a positive wake-up status, e.g., the input-output connection or the input-output device connected to the input-output management device.

The input-output management device may be, may be part of, or may include another controller, integrated circuit, logic circuit, special purpose computer, processor, and/or other components that execute one or more software or firmware programs that provide the described functionality. In an embodiment, the input-output management device may be or may comprise an application specific integrated circuit.

The electronic device may be any electronic device having a microcontroller and an input-output management device managing input-output connections. The electronic device may be a vehicle electronic control unit. Examples of an electronic control unit include a telematics control unit, multimedia system, navigation system, instrument cluster, engine control unit, any other ECUs of a vehicle, and any combination thereof.

The microcontroller may be a computing device to enable the functions of the electronic device. The microcontroller may include one or more processors, such as a central processing unit and other processors, transitory and non-transitory computer-readable storage media or memory, such as RAM, ROM, flash memory and cache memory, suitable interfaces for receiving information, instructions or any data from other devices and components, and/or other components that execute one or more software or firmware programs that provide the described functionality. Where the electronic device is a vehicle electronic control unit, the microcontroller may be a vehicle microcontroller.

As mentioned above, a typical input-output device connected to a vehicle electronic control unit (ECU) is a CAN bus. In embodiments, connections or lines of the CAN bus transmitting data to and receiving data from the vehicle ECU are connected to the microcontroller. A line of the CAN bus transmitting a wake-up signal may be connected to a wake-up pin connected to the input-output management device. A trigger to wake up the electronic device may be from a CAN bus. A response to a CAN bus triggering the vehicle ECU to wake up includes a CAN wake-up frame. The initialization phase and the operation phase performed by the microcontroller may be in accordance with relevant automotive standards, such as the OSEK standard.

Another typical input-output device connected to an electronic device is a wireless communication module. The wireless communication module may receive wireless messages, such as SMSes, which upon receipt, may trigger the electronic device to wake up from its powered down state. The wireless communication module may transmit a wake-up signal to an electrical pin such as an interrupt pin connected to the microcontroller. The microcontroller may initiate the initialization phase based on such signal received. A response to a wireless message may include a wake-up confirmation message transmitted wirelessly by the wireless communication module. A response to a wireless message may include a wake-up confirmation message to the wireless communication module, which may in turn transmit a wake-up confirmation message to a local network, such as a CAN network.

BRIEF DESCRIPTION OF DRAWINGS

Like numerals denote like parts.

DETAILED DESCRIPTION

Hereinafter, exemplary embodiments of the present invention will be described in detail with reference to the accompanying drawings. The detailed description of this invention will be provided for the purpose of explaining the principles of the invention and its practical application, thereby enabling a person skilled in the art to understand the invention for various exemplary embodiments and with various modifications as are suited to the particular use contemplated. The detailed description is not intended to be exhaustive or to limit the invention to the precise embodiments disclosed. Modifications and equivalents will be apparent to practitioners skilled in this art and are encompassed within the spirit and scope of the appended claims.

In an embodiment, there is provided an electronic device. The electronic device comprises an input-output management device configured to manage input-output connections. The electronic device comprises a microcontroller communicatively connected to the input-output management device. The microcontroller is configured to perform an initialization phase after a trigger is received from an input-output connection to wake the electronic device from a powered down state. The initialization phase comprises: obtaining, from the input-output management device, wake-up statuses of the input-output connections managed by the input-output management device; and storing the statuses in a memory of the microcontroller. The microcontroller is further configured to perform an operation phase after the initialization phase. The operation phase comprises: transmitting a wake-up confirmation message to the input-output connection with a positive wake-up status.

In another embodiment, there is provided a method of responding to a trigger to wake an electronic device from a powered down state. The method comprises receiving a trigger from an input-output connection of the electronic device to wake the electronic device from the powered down state. The method further comprises performing, by a microcontroller of the electronic device, an initialization phase. The initialization phase comprises: obtaining, from an input-output management device communicatively connected to the microcontroller, wake-up statuses of input-output connections managed by the input-output management device; and storing the statuses in a memory of the microcontroller.

The method further comprises: performing, by the microcontroller, an operation phase after the initialization phase. The operation phase comprises: transmitting a wake-up confirmation message to the input-output connection with a positive wake-up status.

Figure 1:
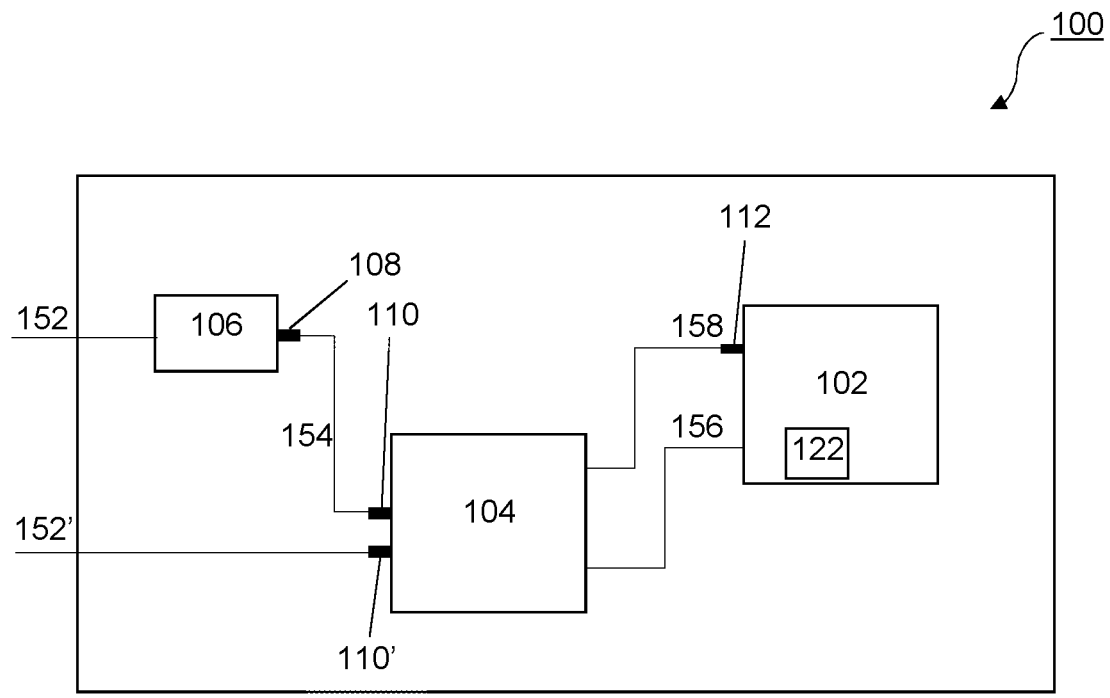
FIG. 1 shows an illustration of an electronic device 100 in accordance with an embodiment of the invention.

FIG. 1 shows an illustration of an electronic device 100 in accordance with an embodiment of the invention. The electronic device 100 is a telematics control unit comprising an application specific integrated circuit (ASIC) 104. ASIC 104 is an input-output management device configured to manage input-output connections. Input-output devices connected to ASIC 104 include CAN bus 152 and other input-output devices (generically denoted as 152'). CAN bus 152 is connected to CAN transceiver 106 of the telematics control unit (TCU) 100. Line 154 from the CAN transceiver 106 to the ASIC 104 connects an inhibit pin 108 on transceiver 106 to a wake-up pin 110 on the ASIC 104. Other pins to which lines are connected are not shown.

ASIC 104 drives the outputs received from the input-output devices 152, 152' connected to TCU 100. Further, ASIC 104 manages the wake-up process when any input-output device activates wake-up. Some TCUs may have wake-up pins connected to the microcontroller. However, in TCU 100, ASIC 104 is connected to wake-up pins 110, 110' of the input-output devices 152, 152', which are connected to lines 154, 152' respectively. Involvement of ASIC 104 creates additional considerations in order to optimize the wake-up procedure.

TCU 100 comprises a vehicle microcontroller 102 communicatively connected to the ASIC 104 by communicative connection line 156, which is an SPI bus. In addition, an interrupt pin 112 on microcontroller 102 is connected to the ASIC 104 by line 158. The microcontroller 102 is configured to execute firmware in accordance with OSEK standards. The firmware includes an operating system for running of applications and/or other software.

The firmware of microcontroller 102 includes an initialization phase or initialization tasks such as OSEK initialization and network management initialization. The firmware includes an operation phase or operational tasks such as the OSEK periodic task and the network management periodic task. The initialization phase and the operation phase are part of the operating system of the microcontroller 102.

During power up, e.g. when a trigger is received to wake TCU 100 from a powered down state, microcontroller 102 is configured to perform the initialization phase. The firmware of microcontroller 102 provides logic to initialize hardware components, such as SPI bus 156, during OSEK initialization. The initialization phase comprises completing initialization of the hardware components, including SPI bus 156, prior to the step of obtaining the wake-up statuses. The microcontroller 102 comprises an ASIC software module (not shown) configured to communicate with the ASIC 104, which may be initialized as part of the OSEK initialization task. However, further tasks are required for stabilizing the ASIC software module and such tasks are completed only during the operation phase of microcontroller 102. While the ASIC software module may be configurable to obtain the wake-up hardware input statuses from ASIC 104 via SPI bus 156, the statuses can only be obtained after the ASIC software module completes its initialization, which may not optimize the time taken to respond to a wake-up trigger.

Instead, the network management initialization task of microcontroller 102 is configured to include logic to obtain the wake-up hardware input statuses from ASIC 104. Once initialization of SPI bus 156 is completed, the network management initialization task includes instructions to command the ASIC 104 to transmit the wake-up hardware input statuses via the SPI bus 156. The instructions include obtaining statuses of the wake-up pins 110, 110' of lines 154, 152' from a register of the ASIC 104 and transmitting the statuses through SPI bus 156. The instructions also include storing the statuses in the RAM memory 122 of microcontroller 102 for use once the microcontroller 102 is operational.

Once initialization of the operating system has been completed, microcontroller 102 enters into the operation phase. When the network management periodic tasks are invoked, the statuses of the wake-up pins 110, 110' stored in the RAM 122 are analysed to determine which wake-up pin registered a pulse. Upon determining the pin that woke up the TCU 100, a network management periodic task includes transmitting a wake-up confirmation message to the responsible pin. Since obtaining the wake-up hardware input statuses is not constrained by stabilization of the ASIC software module, the time taken to transmit the wake-up confirmation message is optimized.

Figure 2:
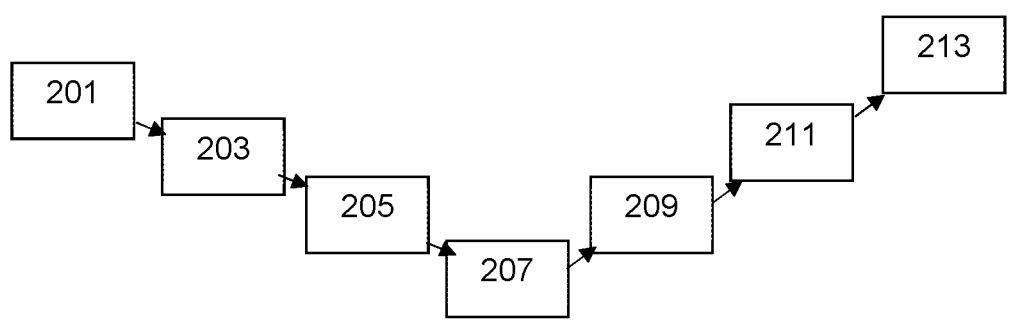
FIG. 2 shows a flow diagram of a method 200 according to an embodiment of the invention.

FIG. 2 shows a flow diagram of a method 200 according to an embodiment of the invention. Method 200 is described by referring to the TCU 100 of FIG. 1. Method 200 describes a method to respond to a trigger from a CAN bus 152 to wake TCU 100 from a powered down state.

Awakening of CAN bus 152 by a trigger will in turn trigger TCU 100 to wake up. In step 201, the awakened CAN bus 152 triggers a pulse to inhibit pin 108 of CAN transceiver 106, which in turn triggers a pulse to wake-up pin 110 connected to ASIC 104.

In step 203, the activation of wake-up pin 110 initializes ASIC 104. Upon wake up, ASIC 104 is configured to record the statuses of the wake-up pins 110, 110' in a register. ASIC 104 is also configured to cause line 158 to transmit an electrical signal to interrupt pin 112 of microcontroller 102 to wake up the microcontroller 102.

In step 205, upon wake up, the microcontroller 102 is configured to perform OSEK initialization tasks. In an OSEK initialization task, hardware components of the microcontroller 102 are initialized, including the SPI bus 156. Since the microcontroller 102 needs to get the status of the wake-up pins 110, 110' from ASIC, in step 207, a network management initialization task may be configured to command the operational SPI bus 156 to transmit the statuses of the wake-up pins 110, 110' in the register of ASIC 104 to the microcontroller 102. The microcontroller 102 is therefore able to obtain wake-up statuses of pins 110, 110' from ASIC 104 and store them in its RAM 122 in step 209.

Once initialization of the operating system has been completed, microcontroller 102 enters into the operation phase. The operation phase includes network management periodic tasks. In step 211, a network management periodic tasks includes analysing the statuses of the wake-up pins 110, 110' stored in the RAM 122 to determine which wake-up pin registered a pulse. Upon determining that pin 110 woke up the TCU 100, indicating that CAN bus 152 triggered the device wake-up, a CAN wake-up frame is transmitted to the CAN bus 152 in step 213.

The invention claimed is:

1. An electronic device comprising:
an input-output management device configured to manage input-output connections; and
a microcontroller communicatively connected to the input-output management device,
wherein the microcontroller is configured to perform an initialization phase upon receiving a trigger from a CAN bus via an input-output connection to wake the electronic device from a powered down state, the initialization phase comprising:
obtaining, from the input-output management device, wake-up statuses of the input-output connections managed by the input-output management device; and
storing the statuses in a memory of the microcontroller;
wherein the microcontroller is further configured to perform an operation phase after the initialization phase, the operation phase comprising:
transmitting a wake-up confirmation message, wherein the wake-up confirmation message is a CAN wake-up frame, to the input-output connection with a positive wake-up status, wherein the operation phase uses the statuses stored in the memory of the microcontroller during the initialization phase thereby minimizing a response time from receiving the trigger until transmitting the wake-up confirmation message to the input-output connection with the positive wake-up status by not having to wait for additional modules or components to become operationally ready in order to transmit the wake-up confirmation message to the input-output connection with the positive wake-up status.

2. The electronic device of claim 1, wherein the initialization phase and the operation phase are part of an operating system of the microcontroller.

3. The electronic device of claim 2, wherein the operating system complies with OSEK (Open Systems and Their Interfaces for Electronics in Motor Vehicles).

4. The electronic device of claim 1, wherein the initialization phase further comprises completing initialization of the communicative connection between the microcontroller and the input-output management device, prior to the step of obtaining the wake-up statuses.

5. The electronic device of claim 1, wherein the electronic device is a vehicle electronic control unit.

6. The electronic device of claim 1, wherein the wake-up statuses are obtained from wake-up pins of the input-output connections, the wake-up pins being connected to the input-output management device.

7. The electronic device of claim 6, wherein the trigger is received by the wake-up pins.

8. The electronic device of claim 6, wherein the communicative connection is an SPI bus.

9. The electronic device of claim 6, wherein the input-output management device is an application specific integrated circuit.

10. The electronic device of claim 1, wherein the electronic device is an automotive telematics control unit.

11. A method of responding to a trigger to wake an electronic device from a powered down state, the method comprising:
receiving a trigger from a CAN bus via an input-output connection of the electronic device to wake the electronic device from the powered down state;
upon receiving the trigger, performing, by a microcontroller of the electronic device, an initialization phase, wherein the initialization phase comprises:
obtaining, from an input-output management device communicatively connected to the microcontroller, wake-up statuses of input-output connections managed by the input-output management device; and
storing the statuses in a memory of the microcontroller;
performing, by the microcontroller, an operation phase after the initialization phase, wherein the operation phase comprises:

transmitting a wake-up confirmation message, wherein the wake-up confirmation message is a CAN wake-up frame, to the input-output connection with a positive wake-up status, wherein the operation phase uses the statuses stored in the memory of the microcontroller during the initialization phase thereby minimizing a response time from receiving the trigger until transmitting the wake-up confirmation message to the input-output connection with the positive wake-up status by not having to wait for additional modules or components to become operationally ready in order to transmit the wake-up confirmation message to the input-output connection with the positive wake-up status.

12. The method of claim 11, wherein the initialization phase and the operation phase are part of an operating system of the microcontroller.

13. The method of claim 12, wherein the operating system complies with OSEK (Open Systems and Their Interfaces for Electronics in Motor Vehicles).

14. The method of claim 11, wherein the initialization phase further comprises completing initialization of the communicative connection between the microcontroller and the input-output management device, prior to the step of obtaining the wake-up statuses.

15. The method of claim 11, wherein the communicative connection is an SPI bus.

16. The method of claim 11, wherein the electronic device is a vehicle electronic control unit.

17. The method of claim 11, wherein the wake-up statuses are obtained from wake-up pins of the input-output connections, the wake-up pins being connected to the input-output management device.

18. The method of claim 17, wherein the trigger is received by the wake-up pins.

19. The method of claim 11, wherein the input-output management device is an application specific integrated circuit.

20. The method of claim 11, wherein the electronic device is an automotive telematics control unit.

* * * * *